(12) United States Patent
Gruchala et al.

(10) Patent No.: US 7,929,944 B2
(45) Date of Patent: *Apr. 19, 2011

(54) METHOD AND SYSTEM FOR ENABLING A MOBILE USER TO MANAGE CALLS

(75) Inventors: Carol Shifrin Gruchala, Naperville, IL (US); Wayne Robert Heinmiller, Elgin, IL (US); Dianna Inara Tiliks, Palatine, IL (US); John Wesley Moss, Lake Zurich, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 904 days.

This patent is subject to a terminal disclaimer.

(21) Appl. No.: 11/888,862

(22) Filed: Aug. 2, 2007

(65) Prior Publication Data

US 2007/0275692 A1 Nov. 29, 2007

Related U.S. Application Data

(63) Continuation of application No. 11/125,441, filed on May 10, 2005, now Pat. No. 7,263,346.

(51) Int. Cl.
*H04M 11/00* (2006.01)

(52) U.S. Cl. ........................................ 455/405; 455/406

(58) Field of Classification Search ........... 455/405–408
See application file for complete search history.

(56) References Cited

U.S. PATENT DOCUMENTS

| | | | | |
|---|---|---|---|---|
| 5,579,379 | A | * | 11/1996 | D'Amico et al. ......... 379/114.01 |
| 5,812,945 | A | * | 9/1998 | Hansen et al. ................. 455/403 |
| 6,018,652 | A | * | 1/2000 | Frager et al. .................. 455/406 |
| 6,256,504 | B1 | | 7/2001 | Tell et al. |
| 6,311,053 | B1 | * | 10/2001 | Feit et al. ....................... 455/406 |
| 6,397,055 | B1 | | 5/2002 | McHenry et al. |
| 6,868,268 | B2 | | 3/2005 | Worsham et al. |
| 2002/0077076 | A1 | * | 6/2002 | Suryanarayana et al. .... 455/406 |
| 2002/0151293 | A1 | | 10/2002 | Tysor |
| 2002/0193092 | A1 | | 12/2002 | Bhogal et al. |
| 2004/0038672 | A1 | | 2/2004 | Nguyen et al. |
| 2004/0063422 | A1 | | 4/2004 | Nickum |
| 2004/0072544 | A1 | | 4/2004 | Alexis |
| 2004/0203641 | A1 | | 10/2004 | Hazlewood |
| 2004/0209595 | A1 | * | 10/2004 | Bekanich ....................... 455/405 |
| 2004/0224661 | A1 | * | 11/2004 | Pericas et al. ................. 455/406 |
| 2005/0032505 | A1 | | 2/2005 | Himelhoch |
| 2005/0096021 | A1 | | 5/2005 | Benco et al. |
| 2005/0197105 | A1 | * | 9/2005 | McCann .................... 455/412.1 |

\* cited by examiner

*Primary Examiner* — Lester Kincaid
*Assistant Examiner* — Steven Lim
(74) *Attorney, Agent, or Firm* — Brooks Kushman P.C.

(57) ABSTRACT

A method includes provisioning a mobile user with usage minutes for usage calls. The method includes determining whether the mobile user and a telephone user either belong to the same provider or different providers after a call between the users is initiated. The call is designated as a usage call if the users belong to different providers. If the call is a usage call, then the mobile user is advised that the call is a usage call and the number of usage minutes remaining and an affirmation from the mobile user is required to complete the call.

6 Claims, 3 Drawing Sheets

METHOD AND SYSTEM FOR ENABLING A MOBILE USER TO MANAGE CALLS

CROSS-REFERENCE TO RELATED APPLICATIONS

This application is a continuation of U.S. application Ser. No. 11/125,441, filed May 10, 2005, now U.S. Pat. No. 7,263,346, which is hereby incorporated by reference in its entirety.

BACKGROUND OF THE DISCLOSURE

1. Field of the Disclosure

The present disclosure generally relates to wireless telephone methods and systems.

2. Background Art

Wireless telephone service providers offer discounts to their mobile users for mobile to mobile calls made between mobile users belonging to the same service provider. A mobile user is a telephone user having a wireless telephone such as a cellular telephone. A mobile to mobile call is a telephone call made between two mobile users. A mobile to mobile call within the same service provider is a telephone call made between two mobile users belonging to the same service provider.

A mobile user belongs to a service provider by having a service contract with the service provider. The service provider provides mobile service to the mobile user in accordance with the service contract. Upon receiving mobile service from a service provider, a mobile user is able to make calls with other mobile users (belonging to the same or different service providers) and with other land-line users. A land-line user is a telephone user having a land-line telephone connected to the public switched telephone network (PTSN).

Service providers generally provide their mobile users with monthly minutes for their mobile users to use for calls with other telephone users (i.e., other mobile users and land-line users) in a given month. Some service providers generally categorize the monthly minutes into two sets: (i) mobile to mobile minutes for calls which are mobile to mobile calls within the same service provider; and (ii) usage minutes for calls which are usage calls. Usage calls are calls which are not mobile to mobile calls within the same service provider. A call between a mobile user belonging to a service provider and another mobile user belonging to a different service provider is a usage call. Likewise, a call between a mobile user belonging to a service provider and a land-line user is a usage call.

Service providers offer a variety of monthly minute call packages to their mobile users. For example, service providers provide mobile users with unlimited mobile to mobile minutes for mobile to mobile calls within the same service provider. In this instance, a mobile user belonging to a service provider has unlimited minutes for calls with other mobile users belonging to the same service provider. That is, the service provider does not charge any minutes (mobile to mobile or usage minutes) against the mobile user for calls with other mobile users belonging to the same service provider.

As another example, service providers provide their mobile users with a limited number of mobile to mobile minutes for mobile to mobile calls within the same service provider. In this instance, a mobile user belonging to a service provider is allotted a limited number of mobile to mobile minutes for calls with other mobile users belonging to the same service provider. That is, the service provider charges mobile to mobile minutes against the mobile user for calls with other mobile users belonging to the same service provider. As such, once the mobile user has exhausted the allotted number of mobile to mobile minutes, the service provider treats additional mobile to mobile calls within the same service provider as usage calls and charges usage minutes against the mobile user for these additional mobile to mobile calls.

Service providers charge usage minutes against their mobile users for usage calls (i.e., calls that are not mobile to mobile calls within the same service provider or mobile to mobile calls within the same service provider that are treated as usage calls). As such, service providers charge usage minutes against their mobile users for calls with other mobile users belonging to different service providers. Likewise, service providers charge usage minutes against their mobile users for calls with land-line users. As indicated above, service providers charge usage minutes against their mobile users for mobile to mobile calls within the same service provider once their mobile users have exhausted their allotted number of mobile to mobile minutes. Further, once mobile users have exhausted their allotted number of usage minutes, service providers charge extra usage fees against their mobile users for additional usage calls.

A problem is that when a mobile user originates or receives a telephone call to/from another telephone user (i.e., another mobile user or a land-line user), the mobile user may not know whether the call is a mobile to mobile call within the same service provider. If the call is a mobile to mobile call within the same service provider and if the mobile user has an allotted limited number of mobile to mobile minutes for mobile to mobile calls within the same service provider, then another problem is that the mobile user probably does not know how many of the allotted mobile to mobile minutes are left for the mobile user to use before the service provider charges usage minutes against the mobile user.

DETAILED DESCRIPTION OF THE PREFERRED EMBODIMENT(S)

Figure 1:
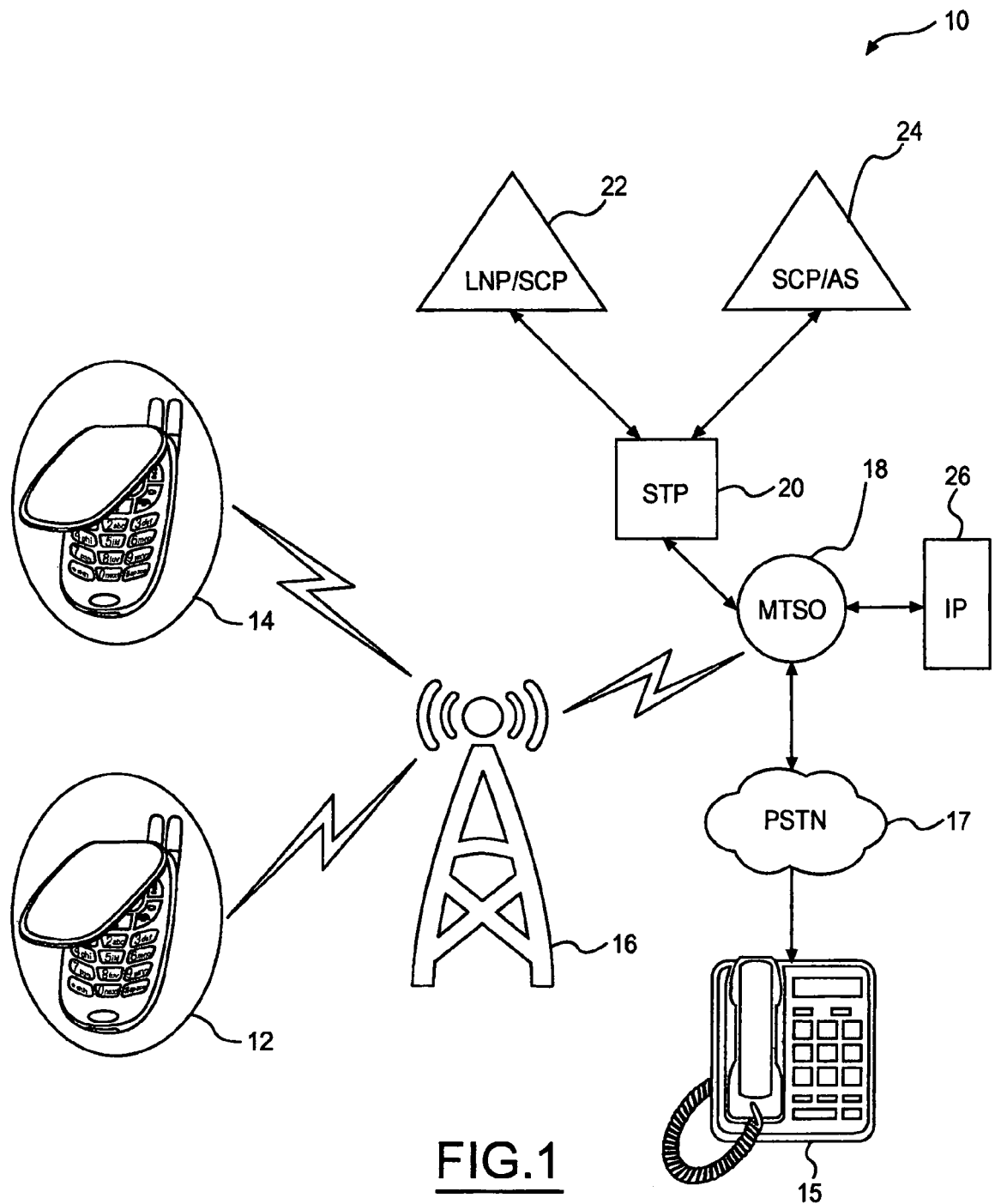
FIG. 1 illustrates a telephone network for implementing the method and system for enabling mobile users to manage calls in accordance with an embodiment of the present disclosure.

The present disclosure discloses an embodiment of a method which includes provisioning a mobile user with usage minutes for usage calls. The method includes determining whether the mobile user and a telephone user either belong to the same provider or different providers after a call between the users is initiated. The call is designated as a usage call if the users belong to different providers. If the call is a usage call, then the mobile user is advised that the call is a usage call and the number of usage minutes remaining and an affirmation from the mobile user is required to complete the call.

The present disclosure discloses an embodiment of a system which includes a network and a processor. The network enables a call between the mobile user and a telephone user to be initiated. The mobile user is provisioned with usage minutes for usage calls. The processor determines whether the users either belong to the same provider or different providers. The processor designates the call as a usage call if the users belong to different providers. If the call is a usage call, then the processor via the network advises the mobile user that the call is a usage call and the number of mobile to mobile minutes remaining and instructs the network to complete the call upon receiving an affirmation from the mobile user to complete the call.

The present disclosure discloses an embodiment of a method which includes provisioning a mobile user with mobile to mobile minutes for mobile to mobile calls within the same provider during a given time period and with usage minutes for usage calls during the given time period. The method includes determining whether the users either belong to the same provider or different providers after a call between the users is initiated. The call is designated as a mobile to mobile call within the same provider if the users belong to the same provider and if at least some of the mobile to mobile minutes are remaining for the given time period. The call is designated as a usage call either if the users belong to different providers or if none of the mobile to mobile minutes are remaining for the given time period. If the call is a mobile to mobile call within the same provider, then the call is completed. If the call is a usage call, then the mobile user is advised that the call is a usage call and the number of usage minutes remaining and an affirmation from the mobile user is required to complete the call.

Methods and systems for enabling mobile users to manage calls in accordance with the present disclosure has many advantages. In general, methods and systems in accordance with the present disclosure enable service providers to provide a "mobile usage manager" service for their mobile users. A mobile user that subscribes to the mobile usage manager is able to screen originating and incoming calls and decide whether to allow the calls to terminate. The mobile user is able to decide whether to allow the calls to terminate based on whether the calls are mobile to mobile calls within the same service provider and, if so, whether the mobile user has enough of an allotted number of mobile to mobile minutes remaining for such calls before the service provider charges usage minutes against the mobile user.

If a call between the mobile user and another mobile user is a mobile to mobile call within the same service provider and if the mobile user has an unlimited number of mobile to mobile minutes for mobile to mobile calls within the same service provider, then the mobile usage manager allows the call to terminate without any authorization required by the mobile user.

If a call between the mobile user and another mobile user is a mobile to mobile call within the same service provider and if the mobile user has a limited number of mobile to mobile minutes for mobile to mobile calls within the same service provider, then the mobile usage manager provides an indication regarding same to the mobile user. This indication generally indicates to the mobile user one or more of the following pieces of information: (i) the call is a mobile to mobile call within the same provider; (ii) the number of the mobile to mobile minutes remaining for the mobile user to use before the service provider charges usage minutes against the mobile user for the call; (iii) the number of mobile to mobile minutes exhausted by the mobile user for previous mobile to mobile calls within the same service provider; and (iv) identification information (such as name and telephone number) of the other mobile user. Based on the indication, the mobile user can decide to allow the call to terminate knowing that the service provider will charge mobile to mobile minutes against the mobile user for the call if mobile to mobile minutes are remaining or that the service provider will charge usage minutes against the mobile user for the call if the mobile to mobile minutes have been exhausted. Conversely, the mobile user can decide to instruct the service provider to prevent the call from terminating based on the indication.

If a call between the mobile user and another telephone user is not a mobile to mobile call within the same service provider (which occurs when either the other telephone user is a mobile user belonging to a different service provider or the other telephone user is a land-line user), then the mobile usage manager provides an indication regarding same to the mobile user. This indication generally indicates to the mobile user one or more of the following pieces of information: (i) the call is not a mobile to mobile call within the same service provider; (ii) the number of usage minutes remaining for the mobile user to use before the service provider charges extra fees against the mobile user for the call; (iii) the number of usage minutes exhausted by the mobile user for previous usage calls; and (iv) identification information (such as name and telephone number) of the other telephone user. Based on the indication, the mobile user can decide to allow the call to terminate knowing that the service provider will charge usage minutes or extra fees against the mobile user for the call. Conversely, based on the indication, the mobile user can decide to instruct the service provider to prevent the call from terminating knowing that the service provider will charge usage minutes or extra fees against the mobile user for call.

Referring now to FIG. 1, a telephone network 10 for implementing the method and system for enabling mobile users to manage calls in accordance with an embodiment of the present disclosure is shown. Network 10 generally enables a first mobile user 12 to make calls with a second mobile user 14 and a land-line user 15. More particularly, network 10 enables first mobile user 12 and second mobile user 14 to make mobile to mobile calls with one another. Likewise, network 10 enables first mobile user 12 and land-line user 15 to make telephone calls with one another.

For example, first mobile user 12 may originate a call to second mobile user 14. In this case, the call is designated as an originating mobile to mobile call. The call is a mobile to mobile call within the same service provider if first and second mobile users 12 and 14 belong to the same service provider. Alternatively, the call is not a mobile to mobile call within the same service provider if first and second mobile users 12 and 14 belong to different service providers. In this case, the call is a usage call.

As another example, first mobile user 12 may receive a call from second mobile user 14. In this case, the call is designated as a terminating mobile to mobile call. The call is a mobile to mobile call within the same service provider if first and second mobile users 12 and 14 belong to the same service provider. Alternatively, the call is not a mobile to mobile call within the same service provider if first and second mobile users 12 and 14 belong to different service providers. In this case, the call is a usage call.

As another example, first mobile user 12 may originate a call to land-line user 15. In this case, the call is a usage call and is not a mobile to mobile call (as land-line user 15 does not belong to a service provider). Likewise, for example, first mobile user 12 may receive a call from land-line user 15. In this case, the call is a usage call and is not a mobile to mobile call.

Network 10 generally embodies an advanced intelligent network (AIN) having the following general features. First, network 10 can affect the routing of a call based on some criteria other than the normal criteria of simply finding a path through the network for the call based on the telephone number originally dialed. Second, network 10 enables a mobile user to inject intelligence into the network and affect the flow of a call to be established (originating or terminating) with the mobile user.

In accordance with the present disclosure, network 10 includes a mobile telephone switching office (MTSO) 18 which wirelessly communicates with mobile users via a cellular tower 16. General functions handled by MTSO 18 include monitoring calls, keeping track of the location of the mobile users, keeping track of billing, switching calls to a wire-based (land-line) central office of the public switched telephone network (PTSN) 17, etc. Network 10 further includes a signal transfer point (STP) 20, a local number portability/signal control point (LNP/SCP) 22, and a signal control point/application server (SCP/AS) 24. STP 20 communicates messages between MTSO 18, LNP/SCP 22, and SCP/AS 24.

SCP/AS 24 generally stores subscription information about mobile users. For example, the subscription information of a mobile user includes information regarding the service provider of the mobile user and includes provisioning information regarding the mobile to mobile minutes and usage minutes provisioned for use by the mobile user. LNP/SCP 22 also generally stores information regarding the service providers of mobile users.

Network 10 further includes an intelligent peripheral 26. Intelligent peripheral 26 is an AIN device which provides voice recordings for use by MTSO 18 in accordance with the present disclosure. It is noted that MTSO 18 may also store voice recordings for its use in accordance with the present disclosure. In this case, intelligent peripheral 26, if provided, augments MTSO 18 with additional voice recordings for use by the MTSO.

In accordance with the present disclosure, MTSO 18, LNP/SCP 22, and SCP/AS 24 are operable with one another to enable service providers to provide the mobile usage manager service for their mobile users. As generally described above, mobile users that subscribe to the mobile usage manager service are able to screen originating and incoming calls and decide whether to allow these calls to terminate.

The general operation of network 10 in accordance with an embodiment of the present disclosure will now be described. It is assumed that first mobile user 12 is a subscriber to the mobile usage manager service and that a first service provider provides mobile service to the first mobile user. In operation of network 10, originating calls from first mobile user 12 and incoming calls to the first mobile user encounter an AIN trigger at MTSO 18. MTSO 18 halts the processing of a call in response to being triggered.

If the call is an originating call from first mobile user 12 to a telephone user, MTSO 18 queries SCP/AS 24 to inquire as to the identity of the service provider that is providing mobile service to the first mobile user. In accordance with this example, SCP/AS 24 has stored information that identifies the first service provider as being the service provider of the first mobile user. As such, in response to the inquiry, SCP/AS 24 determines that the first service provider is the service provider of first mobile user 12. If the telephone user being called by first mobile user 12 is a mobile user belonging to the first service provider, then either SCP/AS 24 and/or LNP/SCP 22 has stored information indicating same. Accordingly, if SCP/AS 24 does not have stored information indicating that the telephone user belongs to the first service provider, then the SCP/AS 24 queries LNP/SCP 22 to see if the LNP/SCP has such stored information.

If either SCP/AS 24 or LNP/SCP 22 has stored information indicating that the telephone user belongs to the first service provider, then the SCP/AS 24 determines that first mobile user 12 and the telephone user belong to the same service provider. In turn, SCP/AS 24 determines that the call is a mobile to mobile call within the same service provider. If neither SCP/AS 24 nor LNP/SCP 22 has stored information indicating that the telephone user belongs to the first service provider, then the SCP/AS determines that first mobile user 12 and the telephone user do not belong to the same service provider. In turn, SCP/24 determines that the call is a usage call regardless of whether the telephone user is a mobile user or a land-line user.

If the call is a terminating call from the telephone user to first mobile user 12, MTSO 18 queries SCP/AS 24 to inquire as to the identity of the service provider that is providing mobile service to the first mobile user. Again, SCP/AS 24 determines that first mobile user 12 belongs to the first service provider from the first mobile user information stored by the SCP/AS. Based on service provider information (if any) stored in SCP/AS 24 and/or LNP/SCP 22 for the telephone user, the SCP/AS determines whether first mobile user 12 and the telephone user belong to the same service provider. If first mobile user 12 and the telephone user belong to the same service provider, then SCP/AS 24 determines that the call is a mobile to mobile call within the same service provider. If first mobile user 12 and the telephone user do not belong to the same service provider, then SCP/AS 24 determines that the call is a usage call regardless of whether the telephone user is a mobile user or a land-line user.

In sum, SCP/AS 24 determines whether called (originating) and calling (terminating) telephone users are mobile users belonging to the same service provider. SCP/AS 24 makes this determination in order to determine whether a call is a mobile to mobile call within the same service provider.

In general, if SCP/AS 24 determines that a call from/to first mobile user 12 is a mobile to mobile call within the same service provider and that the first mobile user has an unlimited number of mobile to mobile minutes, then the SCP/AS returns a suitable response message to MTSO 18. MTSO 18 then allows the call to terminate without requiring authorization from first mobile user 12. If SCP/AS 24 determines that a call from/to first mobile user 12 is a mobile to mobile call within the same service provider and that the first mobile user has a limited number of mobile to mobile minutes, then the SCP/AS responds in a number of different ways depending upon options chosen by the first mobile user and whether the call is originating or terminating. If SCP/AS 24 determines that a call from/to first mobile user 12 is not a mobile to mobile call within the same service provider (i.e., a usage call), then the SCP/AS also responds in a number of different ways depending upon options chosen by the first mobile user and whether the call is originating or terminating.

Figure 2:
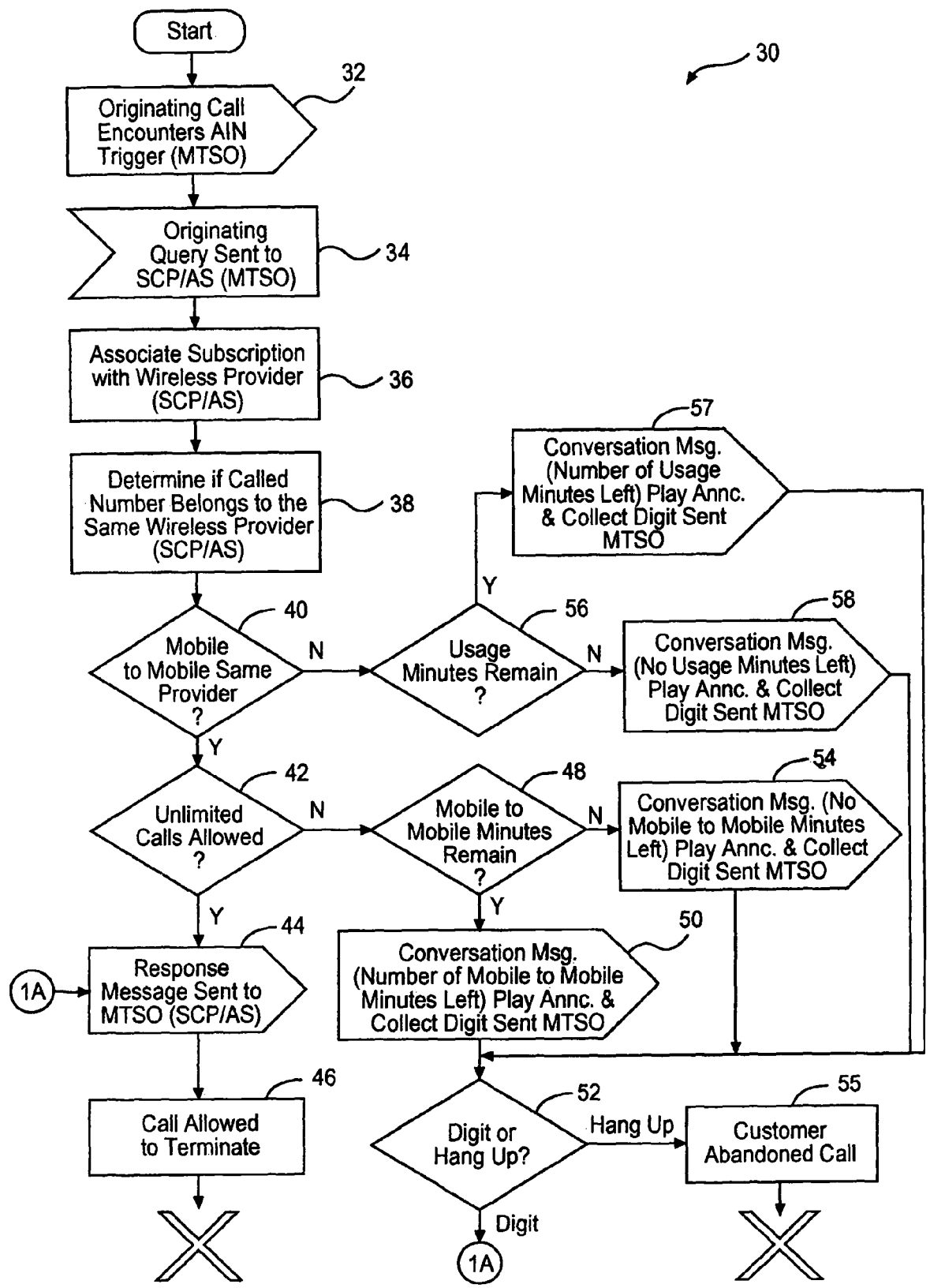
FIG. 2 illustrates a flowchart describing originating call operation of the method and system in accordance with an embodiment of the present disclosure.

Referring now to FIG. 2, with continual reference to FIG. 1, a flowchart 30 describing originating call operation of the method and system in accordance with an embodiment of the present disclosure is shown. The mobile usage manager service provides the originating call operation to first mobile user 12 in response to the first mobile user making a call to another telephone user such as second mobile user 14 or land-line user 15. Again, it is assumed that first mobile user 12 belongs to a first service provider and that the first mobile user is a subscriber to the mobile usage manager service.

The originating call operation initially begins with the originating call from first mobile user 12 encountering an AIN trigger at MTSO 18 as shown in block 32. In response, MTSO 18 halts the processing of the call and sends an originating query to SCP/AS 24 as shown in block 34. In response to the originating query, SCP/AS 24 determines the association of first mobile user 12 with a service provider as shown in block 36. More particularly, SCP/AS 24 determines the service provider of first mobile user 12 and the mobile to mobile minutes and usage minutes provisioned for use by the first mobile user based on subscription information stored by the SCP/AS for the first mobile user. In this example, this information identifies the first service provider as being the service provider for first mobile user 12. SCP/AS 24 then determines if the telephone user is a mobile user belonging to the first service provider based on information stored in the SCP/AS and/or LNP/SCP 22 as shown in block 38.

If first mobile user 12 and the telephone user belong to the same service provider, then SCP/AS 24 determines in block 40 that the call is a mobile to mobile call within the same service provider. If first mobile user 12 and the telephone user do not belong to the same service provider, then SCP/AS 24 determines in block 40 that the call is a usage call (i.e., the SCP/AS determines that the call is not a mobile to mobile call within the same service provider).

If the call is a mobile to mobile call within the same service provider, then SCP/AS 24 determines whether first mobile user 12 has unlimited mobile to mobile minutes for mobile to mobile calls within the same service provider as shown in block 42. If so, then SCP/AS 24 sends a response message indicating same to MTSO 18 as shown in block 44. MTSO 18 then allows the call from first mobile user 12 to terminate to the telephone user as shown in block 46 without requiring authorization by the first mobile user.

If SCP/AS 24 determines in block 42 that first mobile user 12 has a limited number of mobile to mobile minutes for mobile calls within the same service provider, then the SCP/AS queries MTSO 18 as to how many of the limited number of mobile to mobile minutes are remaining for use by the first mobile user as shown in block 48. If any of the mobile to mobile minutes are remaining, then SCP/AS 24 responds with a conversation message to MTSO 18 to play an announcement to first mobile user 12 as shown in block 50. MTSO 18 is able to play announcements on its own or interacts with intelligent peripheral 26 to play announcements. This announcement indicates to first mobile user 12 how many of the allotted mobile to mobile minutes are remaining for use by the first mobile user. This announcement includes a request that first mobile user 12 enter a digit on the wireless phone of the first mobile user if the first mobile user wishes to allow the call terminate. This announcement instructs first mobile user 12 to simply hang-up the wireless phone if the first mobile user does not wish to allow the call to terminate to the telephone user.

MTSO 18 then monitors the wireless phone of first mobile user 12 to determine whether the first mobile user has entered the requested digit or hung-up the wireless phone as shown in block 52. If first mobile user 12 enters the requested digit, then SCP/AS 24 sends a response message to MTSO 18 indicating to the MTSO that the first mobile user wishes the call to terminate as shown in block 44. MTSO 18 then allows the call from first mobile user 12 to terminate to the telephone user as shown in block 46. If first mobile user 12 hangs-up the wireless phone at block 52, then MTSO 18 prevents the call from terminating and the call is abandoned as shown in block 55.

If none of the allotted mobile to mobile minutes for first mobile user 12 are remaining at block 48, then SCP/AS 24 responds with a conversation message to MTSO 18 to play an announcement to first mobile user 12 indicating same as shown in block 54. This announcement indicates to first mobile user 12 that no mobile to mobile minutes are left for the first mobile user to use and that the call will be treated as a usage call. This announcement requests that first mobile user 12 enter a digit on the wireless phone of the first mobile user if the first mobile user wishes to allow the call to terminate. This announcement instructs first mobile user 12 to simply hang-up the wireless phone if the first mobile user does not wish to allow the call to terminate to the telephone user. The flow process then continues to block 52 as described above.

Instead of playing the announcement to first mobile user 12 that no mobile to mobile minutes are remaining for use by the first mobile user as described above with reference to block 54, an alternative option is for MTSO 18 to play a tone to the first mobile user identifying the call as a usage call. First mobile user 12 can then decide whether to abandon the call (hang-up) or let the call terminate (remain off hook).

If SCP/AS 24 determines in decision block 40 that the call is not a mobile to mobile call within the same service provider (which occurs when the telephone user being called is a mobile user belonging to a different service provider than the service provider of first mobile user 12 or when the telephone user being called is a land-line user), then the SCP/AS returns a query to MTSO 18 inquiring the MTSO to determine whether the first mobile user has any usage minutes remaining for the call as shown in block 56. In this case, the call is a usage call.

If any of the usage minutes are remaining, then SCP/AS 24 responds with a conversation message to MTSO 18 to play an announcement indicating same to first mobile user 12 as shown in block 57. This announcement indicates to first mobile user 12 that the call is a usage call and indicates how many of the allotted usage minutes are remaining for use by the first mobile user. The announcement includes a request that first mobile user 12 enter a digit on the wireless phone of the first mobile user if the first mobile user wishes to allow the call terminate. The announcement instructs first mobile user 12 to simply hang-up the wireless phone if the first mobile user does not wish to allow the call to terminate to the telephone user. The flow process then continues to block 52 as described above.

If none of the usage minutes are remaining, then SCP/AS24 responds with a conversation message to MTSO 18 to play an announcement indicating same to first mobile user 12 as shown in block 58. This announcement indicates to first mobile user 12 that the call is a usage call and indicates that no usage minutes are remaining for use by first mobile user 12. The announcement includes a request that first mobile user 12 enter a digit on the wireless phone of the first mobile user if the first mobile user wishes to allow the call terminate. The announcement instructs first mobile user 12 to simply hang-up the wireless phone if the first mobile user does not wish to allow the call to terminate to the telephone user. The flow process then continues to block 52 as described above. Again, instead of the announcement, MTSO 18 could play a tone to first mobile user 12 which identifies the call as a usage call. First mobile user 12 can then decide on abandoning the call or allowing the call to terminate to the telephone user (knowing that the service provider will charge extra usage fees against the first mobile user for the call).

Figure 3:
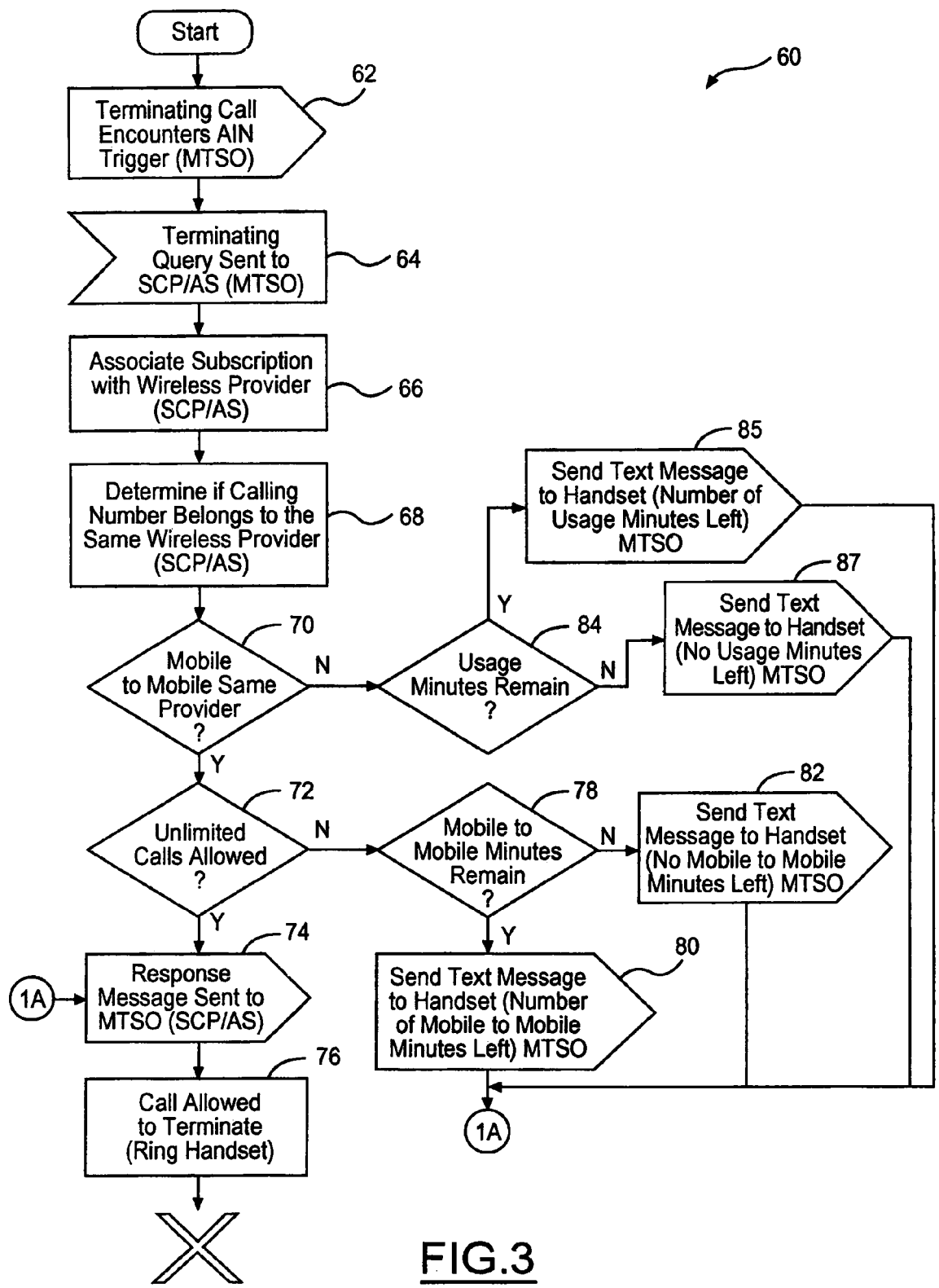
FIG. 3 illustrates a flowchart describing terminating call operation of the method and system in accordance with an embodiment of the present disclosure.

Referring now to FIG. 3, with continual reference to FIGS. 1 and 2, a flowchart 60 describing terminating call operation of the method and system in accordance with an embodiment of the present disclosure is shown. The mobile usage manager service provides the terminating call operation to first mobile user 12 in response to the first mobile user receiving a call from another telephone user such as second mobile user 14 or land-line user 15. Again, it is assumed that first mobile user 12 belongs to a first service provider and that the first mobile user is a subscriber to the mobile usage manager service.

The terminating call operation initially begins with the terminating call from a telephone user to first mobile user 12 encountering an AIN trigger at MTSO 18 as shown in block 62. In response, MTSO 18 halts the processing of the call and sends a terminating query to SCP/AS 24 as shown in block 64. In response to the terminating query, SCP/AS 24 determines the association of first mobile user 12 with a service provider as shown in block 66. More particularly, SCP/AS 24 determines the service provider of first mobile user 12 and the mobile to mobile minutes and usage minutes provisioned for use by the first mobile user based on subscription information stored by the SCP/AS for the first mobile user. In this example, this information identifies the first service provider as being the service provider for first mobile user 12. SCP/AS 24 then determines if the telephone user is a mobile user belonging to the first service provider based on information stored in the SCP/AS and/or LNP/SCP 22 as shown in block 68.

If first mobile user 12 and the telephone user belong to the same service provider, then SCP/AS 24 determines in block 70 that the call is a mobile to mobile call within the same service provider. If first mobile user 12 and the telephone user do not belong to the same service provider, then SCP/AS 24 determines in block 70 that the call is a usage call (i.e., the SCP/AS determines that the call is not a mobile to mobile call within the same service provider).

If SCP/AS 24 determines in block 70 that the call is a mobile to mobile call within the same service provider, then the SCP/AS determines whether first mobile user 12 has unlimited mobile to mobile minutes for mobile calls within the same service provider as shown in block 72. If so, then SCP/AS 24 sends a response message indicating same to MTSO 18 as shown in block 74. MTSO 18 then allows the call from the telephone user to terminate to first mobile user 12 as shown in block 76 without requiring authorization by the first mobile user.

If SCP/AS 24 determines in block 72 that first mobile user 12 has a limited number of mobile to mobile minutes for mobile calls within the same service provider, then the SCP/AS queries MTSO 18 as to how many of the limited number of mobile to mobile minutes are remaining for use by the first mobile user as shown in block 78. If any of the mobile to mobile minutes are remaining, then SCP/AS 24 instructs MTSO 18 to generate a text message regarding the number of mobile to mobile minutes remaining for use by first mobile user 12 as shown in block 80. MTSO 18 is able to generate text messages on its own or interacts with intelligent peripheral 26 to generate text messages.

This instruction given to MTSO 18 is part of a response message provided by SCP/AS 24 for the MTSO as shown in block 74. This response message further instructs MTSO 18 to ring the wireless phone of first mobile user 12 in response to the call from the telephone user while providing this text message to the first mobile user. First mobile user 12 can decide whether to answer the call based on this text message. If first mobile user 12 answers the call, then MTSO 18 allows the call from the telephone user to terminate to first mobile user 12 as shown in block 76.

If none of the allotted mobile to mobile minutes for first mobile user 12 are remaining at block 78, then SCP/AS 24 instructs MTSO 18 to generate a text message indicating same for the first mobile user as shown in block 82. This text message indicates to first mobile user 12 that none of the allotted mobile to mobile minutes are remaining for the first mobile user to use and that the call will be treated as a usage call. The instruction given to MTSO 18 is part of a response message provided by SCP/AS 24 for the MTSO as shown in block 74. This response message further instructs MTSO 18 to ring the wireless phone of first mobile user 12 in response to the call from the telephone user while providing this text message to the first mobile user. First mobile user 12 can decide whether to answer the call based on this text message. If first mobile user 12 answers the call, then MTSO 18 allows the call from the telephone user to terminate to first mobile user 12 as shown in block 76.

Alternatively, first mobile user 12 can choose an option in which all usage calls are automatically blocked from terminating to the first mobile user. Further, first mobile user 12 can choose an option in which such usage calls are automatically sent to a voice mail system set up for the first mobile user. Further, MTSO 18 can provide to first mobile user 12 an announcement announcing the call as a usage call.

If SCP/AS 24 determines in block 70 that the call is not a mobile to mobile call within the same service provider (which occurs when the telephone user calling first mobile user 12 is a mobile user belonging to a different service provider than the service provider of the first mobile user or when the telephone user is a land-line user), then the SCP/AS returns a query to MTSO 18 inquiring the MTSO to determine whether the first mobile user has any usage minutes remaining for the call. In this case, the call is a usage call.

If any of the usage minutes are remaining, then SCP/AS 24 instructs MTSO 18 to generate a text message for first mobile user 12 indicating same as shown in block 85. This text message indicates to first mobile user 12 that the call is a usage call and further indicates to the first mobile user how many of the allotted usage minutes are remaining for use by the first mobile user. The instruction given to MTSO 18 is part of a response message provided by SCP/AS 24 for the MTSO as shown in block 74. This response message further instructs MTSO 18 to ring the wireless phone of first mobile user 12 in response to the call from the telephone user while providing this text message to the first mobile user. First mobile user 12 can decide whether to answer the call based on this text message. If first mobile user 12 answers the call, then MTSO 18 allows the call from the telephone user to terminate to first mobile user 12 as shown in block 76.

If none of the usage minutes are remaining, then SCP/AS 24 instructs MTSO 18 to generate a text message for first mobile user 12 indicating same as shown in block 87. This text message indicates to first mobile user 12 that the call is a usage call and further indicates to the first mobile user that none of the allotted usage minutes are remaining for use by the first mobile user. Again, the instruction given to MTSO 18 is part of a response message provided by SCP/AS 24 for the MTSO as shown in block 74. This response message further instructs MTSO 18 to ring the wireless phone of first mobile user 12 in response to the call from the telephone user while providing this text message to the first mobile user. First mobile user 12 can decide whether to answer the call based on this text message. If first mobile user 12 answers the call, then MTSO 18 allows the call from the telephone user to terminate to first mobile user 12 as shown in block 76.

Again, first mobile user 12 can choose options in which usage calls are automatically blocked from terminating to the first mobile user, usage calls are automatically sent to a voice mail system, etc. Further, MTSO 18 can provide to first mobile user 12 an announcement announcing the call as a usage call.

In accordance with the present disclosure, the logic operations of the mobile usage manager service for mobile users are provisioned by service providers when the service providers set up the mobile services for their mobile users. The service providers are configured to allow their mobile users to update their provisioned mobile usage manager service logic operations via an interactive voice response or via the Internet. In accordance with the present disclosure, mobile users with mobile to mobile specified minute (usage) plans will be above to view their minute usage via the Internet.

In sum, in accordance with the present disclosure, mobile users are able to decide if mobile to mobile calls and usage calls are allowed to be completed and the mobile users are allowed to fully manage their mobile service package contracted with their service providers.

The illustrations of embodiments described herein are intended to provide a general understanding of the structure of various embodiments, and they are not intended to serve as a complete description of all the elements and features of methods and apparatuses that might make use of the structures described herein. Many other embodiments will be apparent to those of skill in the art upon reviewing the above description. Other embodiments may be used and derived therefrom, such that structural and logical substitutions and changes may be made without departing from the scope of this disclosure. The Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C. F. R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:

a network for enabling a call between a mobile user and a telephone user to be initiated, wherein the mobile user is provisioned with mobile to mobile minutes for mobile to mobile calls within the same provider during a given time period and with usage minutes for usage calls during the given time period; and a processor configured to determine whether the users either belong to the same provider or different providers after a call between the users is initiated;

the processor further configured to designate the call as a mobile to mobile call within the same provider if the users belong to the same provider and if at least some of the mobile to mobile minutes are remaining for the given time period;

the processor further configured to designate the call as a usage call either if the users belong to different providers or if none of the mobile to mobile minutes are remaining for the given time period;

wherein if the call is a mobile to mobile call within the same provider, then the processor instructs the network to complete the call without advising the mobile user the number of usage minutes remaining and without requiring an affirmation from the mobile user to complete the call; and wherein if the call is a usage call, then the processor via the network advises the mobile user that the call is a usage call and the number of usage minutes remaining and instructs the network to complete the call upon receiving an affirmation from the mobile user to complete the call.

2. The system of claim 1 wherein:

the processor is further configured to charge mobile to mobile minutes against the mobile user for the call if the call is a mobile to mobile call within the same provider; and the processor is further configured to charge usage minutes against the mobile user for the call if the call is a usage call.

3. The system of claim 2 wherein:

the processor is further configured to charge extra minutes against the mobile user for the call if the call is a usage call and if none of the usage minutes are remaining.

4. The system of claim 1 wherein:

the call is initiated from the mobile user to the telephone user.

5. The system of claim 1 wherein:

the call is initiated from the telephone user to the mobile user.

6. The system of claim 5 wherein:

the processor is further configured to enable the mobile user to direct the call to a voice mail system for the mobile user instead of completing the call to the mobile user if the call is a usage call.

* * * * *